United States Patent [19]

Noel

[11] Patent Number: 4,926,986
[45] Date of Patent: May 22, 1990

[54] CENTRIFUGAL CLUTCH FOR AN ACTUATOR FOR RENDERING INOPERATIVE AN AUTOMOBILE VEHICLE DOOR LATCH

[75] Inventor: Jean P. Noel, Saint Die, France
[73] Assignee: Rockwell-CIM, France
[21] Appl. No.: 282,159
[22] Filed: Dec. 9, 1988
[30] Foreign Application Priority Data
  Dec. 14, 1987 [FR] France .................. 87 17423
[51] Int. Cl.⁵ ............................................. F16D 11/06
[52] U.S. Cl. .................... 192/0.02 R; 192/71; 192/76
[58] Field of Search ............ 192/72, 71, 73, 76, 192/105 BB, 105 BA, 0.02 R; 70/237, 279; 74/414; 292/DIG. 23

[56] References Cited
U.S. PATENT DOCUMENTS
2,511,678 6/1950 Stephenson ........................ 192/76
4,736,829 4/1988 Noel ..................................... 192/71

Primary Examiner—Allan D. Herrmann
Assistant Examiner—Nicholas Whitelaw

[57] ABSTRACT

The clutch comprises at least one weight (11), and preferably two weights, disposed in a bell element (3) radially of the output shaft (2) of the motor (1), subjected to the action of an elastic element (21) for biasing the weight to a de-clutched position at rest, and capable of being driven by centrifugal force developed by the rotation of the shaft (2) of the motor (1) to a clutching position in which the weight engages the bell element (3). The bell element (3) is provided internally with a stressed spring (24) which frictionally bears against the inner wall of the bell element and is provided with at least one clutch dog (24a), and preferably two clutch dogs, cooperative with the weight or weights (11). The spring (24) limits the torque and permits avoiding rebounds in the event of a sudden stoppage of the bell element (3) at the end of the travel of the actuator.

6 Claims, 2 Drawing Sheets

CENTRIFUGAL CLUTCH FOR AN ACTUATOR FOR RENDERING INOPERATIVE AN AUTOMOBILE VEHICLE DOOR LATCH

The present invention relates to a centrifugal clutch for interposing between an electric motor and a gear train driving a screw on which a tapped sleeve is mounted for controlling an element rendering the latch inoperative.

This clutch is of the type comprising at least one weight, and preferably two weights, disposed in a bell radially of the output shaft of the motor, subjected to the action of an elastic return element returning it to a de-clutched position at rest, and capable of being driven by the rotation of the shaft of the motor to a clutched position in which it is engaged with the bell. The latter is provided with a gear wheel for driving the gear train, and the weights are mounted in a support constituted by a hub provided with two substantially axial branches surrounding the weights and defining a cavity for the weights, and by a cover closing said cavity and fixed to the hub. This cover and the hub are adapted to permit the radial movement of the weights toward the bell under the effect of centrifugal force.

This clutch is satisfactory, but it has however been found that the shocks produced by the sudden stoppage of the motor at the end of the travel of the actuator produce a rebound which may produce an untimely de-clutching of the weights by a lack of pressure of contact on their driving dogs with which the bell is provided internally and which cooperate with the weights.

An object of the invention is therefore to provide an improvement which avoids this drawback.

According to the invention, the bell is provided internally with a stressed spring in frictional engagement with the inner wall of the bell and provided with at least one clutch dog, and preferably two clutch dogs, cooperative with the weight or weights, the function of this spring being to drive in rotation by friction the bell and its gear wheel when the weight is in the clutching position.

When large torques due to the inertia of the component parts occur, this spring slides relative to the bell and substantially eliminates the rebound.

The invention will now be described with reference to the accompanying drawings which illustrate an embodiment of the invention by way of a non-limitative example.

Figure 1:
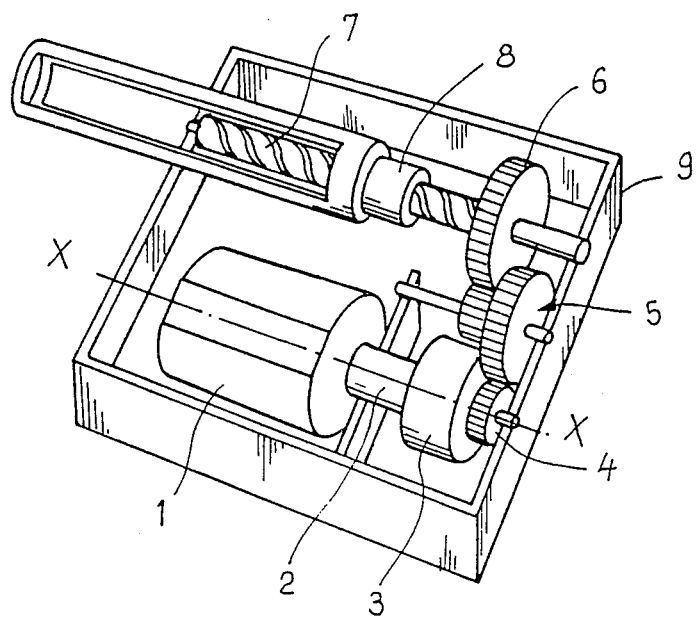
FIG. 1 is a perspective view of an actuator for rendering inoperative an automobile vehicle door latch provided with a clutch which may be of the type according to the invention.

The actuator shown in FIG. 1 is adapted to render electrically inoperative a latch (not shown) of an automobile vehicle door.

It comprises an electric motor 1 provided with a driving output shaft 2 having an axis X—X and cooperative with a coaxial bell element 3 provided with a gear wheel 4 constituting the first element of a gear train 5. The last gear wheel 6 of the train 5 is fixed to a screw 7 on which is mounted a sleeve 8 which may be driven in translation by the rotation of the screw 7 for actuating the element (not shown) rendering the latch inoperative, all of these component parts being disposed within a case 9.

Figure 2:
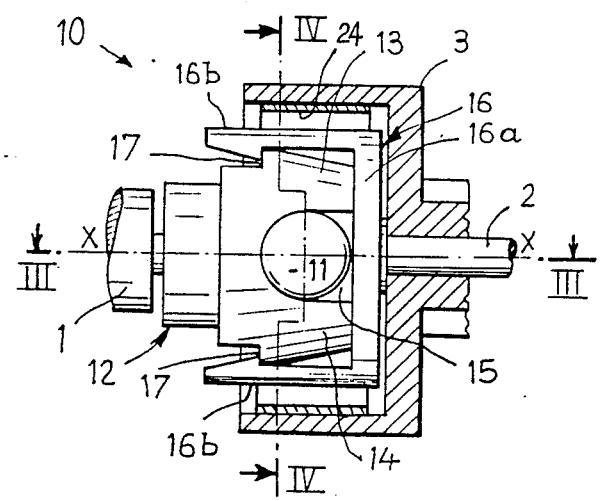
FIG. 2 is a an axial sectional view of an embodiment of a centrifugal clutch according to the invention which may equip the actuator of FIG. 1.
Figure 3:
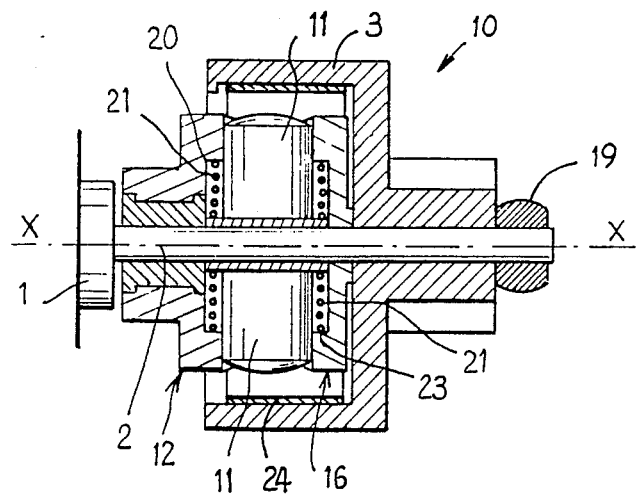
FIG. 3 is an axial sectional view taken on line III—III of FIG. 2.
Figure 4:
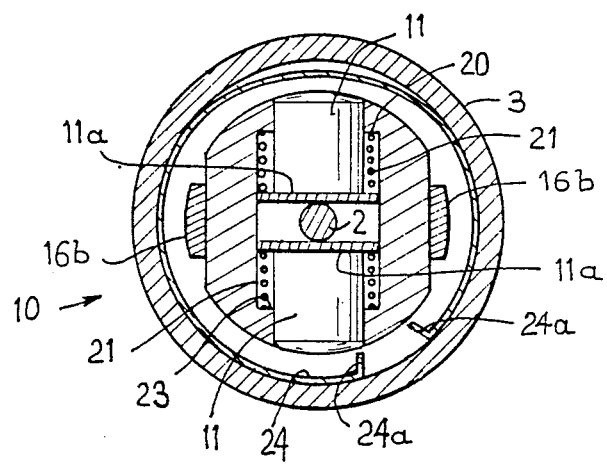
FIG. 4 is a cross-sectional view taken on line IV—IV of FIG. 2.

The clutch 10 shown in FIGS. 2 to 4 comprise weights 11, namely two weights in the presently-described embodiment, mounted to be radially movable relative to the driving shaft 2 inside the bell element 3. The weights 11 may preferably be cylindrical members and are mounted in a support constituted by two distinct elements : a hub 12 provided with the substantially axial branches 13, 14 which are roughly parallel to the shaft 2 of the motor 1 and surround the weights 11 by defining a cavity 15 for the latter, the second element being a cover 16 closing the cavity 15.

The cover 16 includes a portion 16a which is perpendicular to the axis X—X and a second portion formed by two arms 16b parallel to the axis X—X and secured to the hub 12, for example by clipping on steps 17 on the hub. The cover 16 is so arranged as to permit the radial movement of the weights 11 toward the bell element 3 under the effect of centrifugal force when the shaft 2 is driven by the motor 1. A bearing 19 supporting the shaft 2 is fixed to the latter beyond the gear wheel 4.

The weights 11 are elastically biased toward their position of rest in which they bear against the shaft 2 in diametrically opposed positions, by respective springs 21 which bear against inner shoulders 20, 23 respectively on the hub 12 and the cover 16. The cavity 15 defined by the branches 13, 14 and the cover 16 opens radially on both sides onto to wall of the bell element 3 so as to enable the weights 11 to slide radially toward the bell element against the return force exerted by the springs 21 when the shaft 2 rotates at a sufficient speed.

The bell element 3 is provided internally with a stressed spring 24 which frictionally bears against the inner wall of the bell element 3 and is provided with two clutch dogs 24a which are cooperative in turn with the weights 11.

These two dogs 24a are so arranged as to have a surface, which is cooperative with the corresponding weight 11, inclined in such manner as to be parallel with the generatrices of the weight 11 when the latter, which is preferably cylindrical, cooperates with a dog.

Preferably, the spring 24 extends in a circular sector which is slightly less than a complete cimcumference, its opposite ends being constituted by the dogs 24a which are consequently relatively close to each other. Under these conditions, each dog 24a cooperates with one of the two weights 11 in accordance with the direction of rotation of the shaft 2, while the second weight 11 comes to bear against a roughly central region of the spring 24 spaced away from the inner wall of the bell element 3 when the weights 11 are at rest (FIG. 4) and, on the contrary, urged against this inner wall by the weight 11 which does not cooperates with one of the dogs 24a.

When the shaft 2 rotates at sufficient speed, the weights 11 move radially away from each other and one of them comes to bear against a dog 24a as so that the spring 24 drives the bell element 3 in rotation by the effect of friction.

When a sudden stoppage of the rotation of the bell element 3 occurs at the end of the travel of the actuator, the spring slides on the inner surface of the bell element 3, which has for result to avoid rebounds.

Another advantage of the torque-limiting spring 24 provided by the invention resides in the fact that its reduces the stresses in the mechanisms of the actuator and in the clutch itself. Consequently, it is possible to use only a single weight 11, the second weight being then eliminated and its cavity being closed.

The spring 24 normally has two terminal dogs 24a spaced a variable angular distance apart. However, a single dog may possibly be provided on the condition that two suitably inclined opposed surfaces are presented for cooperating in turn with the weight or weights.

I claim:

1. A centrifugal clutch for an actuator for rendering an automobile vehicle door latch inoperative, said clutch being interposed between and combined with an electric motor and a gear train drivingly connected to a screw on which is mounted a tapped sleeve for controlling an element for rendering said latch inoperative, said motor having an output shaft, said clutch comprising: a bell element, at least one weight disposed in the bell element radially of the output shaft of the motor, elastically yieldable return means associated with the weight for biasing the weight to a de-clutched position of rest, the weight being capable of being driven by centrifugal force created by rotation of the shaft of the motor to a clutching position where said weight drives said bell element, the bell element being provided with a gear wheel drivingly connected to said gear train and the weight being mounted in a support comprising a hub having substantially axially aligned branches surrounding the weight and defining a cavity for the weight, a cover closing said cavity and fixed to the hub, said cover and said hub allowing radial displacement of the weight toward the bell element under the effect of centrifugal force, said bell element having an inner wall and a stressed spring in said bell element and frictionally engaging the inner wall of the bell element, said spring having at least one clutch dog positioned for engagement with said weight in said clutching position, whereby said spring is operative to rotatably drive said bell element and said gear-wheel by friction contact with said inner wall of the bell element when the weight engages said clutch dog in said clutching position and to slip on said internal wall of the bell element when rotation of said bell element is suddenly stopped.

2. A clutch according to claim 1, wherein two of said weights are provided.

3. A clutch according to claim 1, wherein two of said clutch dogs are provided and each of said clutch dogs is engageable with said weight.

4. A clutch according to claim 2, wherein two of said clutch dogs are provided and each of said clutch dogs is engageable with said weights.

5. A clutch according to claim 1, wherein the clutch dog has a surface cooperative with the weight and said surface is inclined in such manner as to be parallel to generatrices of the weight.

6. A clutch according to claim 5, wherein said weight is cylindrical.

* * * * *